US005321572A

United States Patent [19]

Shibui et al.

[11] Patent Number: 5,321,572

[45] Date of Patent: Jun. 14, 1994

[54] TRANSFORMER BOBBIN

[75] Inventors: Seiki Shibui, Chofu; Masaaki Sano, Shizuoka, both of Japan

[73] Assignee: Nippon Densen Corporation, Kyoto, Japan

[21] Appl. No.: 849,284

[22] Filed: Mar. 10, 1992

[30] Foreign Application Priority Data

Mar. 28, 1991 [JP] Japan .................................. 3-103729

[51] Int. Cl.[5] ........................ H02H 7/04; H01F 15/10; H01F 27/30

[52] U.S. Cl. ........................................ 361/38; 336/192; 336/198; 361/41

[58] Field of Search ........................ 336/192, 198, 208; 361/35, 36, 37, 38, 39, 40, 41

[56] References Cited

U.S. PATENT DOCUMENTS 3,585,450 6/1971 Lane ...................................... 361/41
4,091,349 5/1978 Niederjohn et al. ................ 336/192
4,363,014 12/1982 Leach et al. ........................ 336/208
4,405,913 9/1983 Finkbeiner .......................... 336/198
4,503,413 3/1985 Stalzer ................................ 336/192
4,716,394 12/1987 Gordon .............................. 336/198
4,857,877 8/1989 Dethienne .......................... 336/198
4,980,664 12/1990 Harwood ............................ 336/198

FOREIGN PATENT DOCUMENTS 2-106007 4/1990 Japan .................................. 336/198

*Primary Examiner*—Thomas J. Kozma
*Attorney, Agent, or Firm*—McCormick, Paulding & Huber

[57] ABSTRACT

A transformer bobbin is provided comprising a frame of approximately a rectangular shape, a first wall arranged on one end of the frame, a second wall arranged on the other end of the frame, and a center wall arranged between the first wall and the second wall. The frame, the first wall, and the center wall constitute in combination a primary winding section. The frame, the center wall, and the second wall constitute in combination a secondary winding section. In particular, the primary winding section has a container case detachably mounted thereto for selective assignment for use. Also, the container is arranged for accommodating a current disconnecting means for deenergizing a transformer circuit when the coil temperature increases up to a limit level.

8 Claims, 7 Drawing Sheets

Fig. 4-A
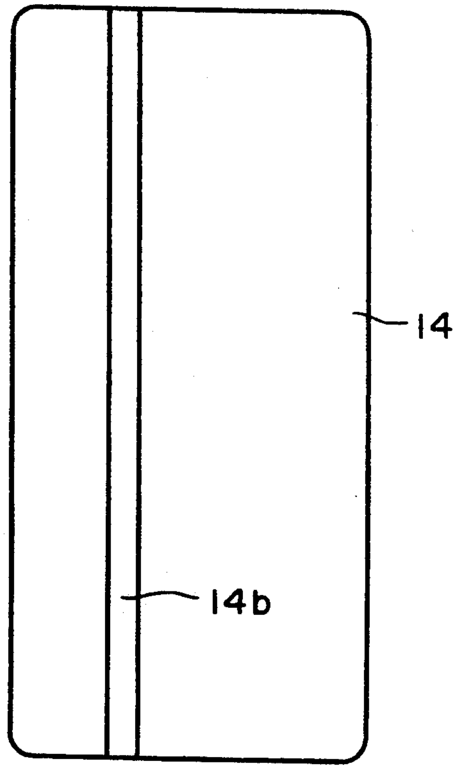
Fig. 4-B
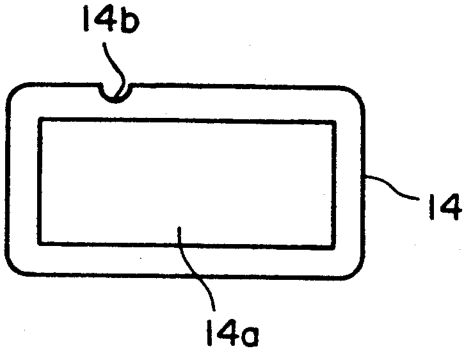

TRANSFORMER BOBBIN

FIELD OF THE INVENTION

The present invention relates to a transformer bobbin for use in an adapter for converting a commercial AC voltage to a DC form.

DESCRIPTION OF PRIOR ART

An adapter (an AC-to-DC converter) which shifts a commercial AC voltage to a lower level and simultaneously, converts it to a DC form, is commonly used for energizing e.g. a portable calculator or tape recorder which also carries batteries as a power source. The adaptor contains a transformer such as introduced in Japanese Utility Model Publication 53-36141 (1978) which is provided with a current disconnecting means or thermal fuse for deenergizing its circuit when its windings are overheated. The transformer comprises a bobbin made of a synthetic resin material and a core arranged across the bobbin. The bobbin comprises a primary winding section carrying a primary coil wound thereon and a secondary winding section carrying a secondary coil wound thereon. The primary winding section has an opening therein for accommodating a thermal fuse. According to the construction of the known transformer bobbin, the thermal fuse is located in the opening and thus, electrically insulated from the coil with no unwanted direct contact. Hence, no insulating arrangement is needed and the installation of the thermal fuse will be facilitated.

However, the application of such an opening for accommodating the thermal fuse to the transformer bobbin produces a drawback. The bobbin incorporates a main frame on which coils are wound. As known, the opening for accommodating the thermal fuse is provided in the frame which is thus needed for having its corresponding wall increased in thickness. As the coil is wound on the wall of the frame of the bobbin which is in common use, it remains spaced by a thickness of the wall from the core even if no thermal fuse is loaded in the opening. This requires an excessive length of wire to be wound to a coil and the transmission loss of energy will be increased.

SUMMARY OF THE INVENTION

It is a primary object of the present invention to provide a transformer bobbin for common use with or without the use of a thermal fuse with equal success.

The other objects of the present invention will be apparent from reading of the description.

A transformer bobbin according to the present invention, which comprises a frame of approximately a rectangular shape, a first wall arranged on one end of the frame, a second wall arranged on the other end of the frame, and a center wall arranged between the first wall and the second wall, is arranged in which the frame, the first wall, and the center wall constitute in combination a primary winding section on which a primary coil is wound while the frame, the center wall, and the second wall constitute in combination a secondary winding section on which a secondary coil is wound. In particular, the primary winding section has a container case detachably mounted thereto for selective assignment for use, while the container being arranged for accommodating a current disconnecting means for deenergizing a transformer circuit when the coil temperature increases up to a limit level.

BRIEF DESCRIPTION OF THE DRAWINGS

FIGS. 4-A and 4-B are a plan and a front view respectively of a container case of the bobbin shown in FIG. 1;

DETAILED DESCRIPTION OF THE PREFERRED EMBODIMENTS

The present invention will be described in more detail, referring to the accompanying drawings.

Figure 1:
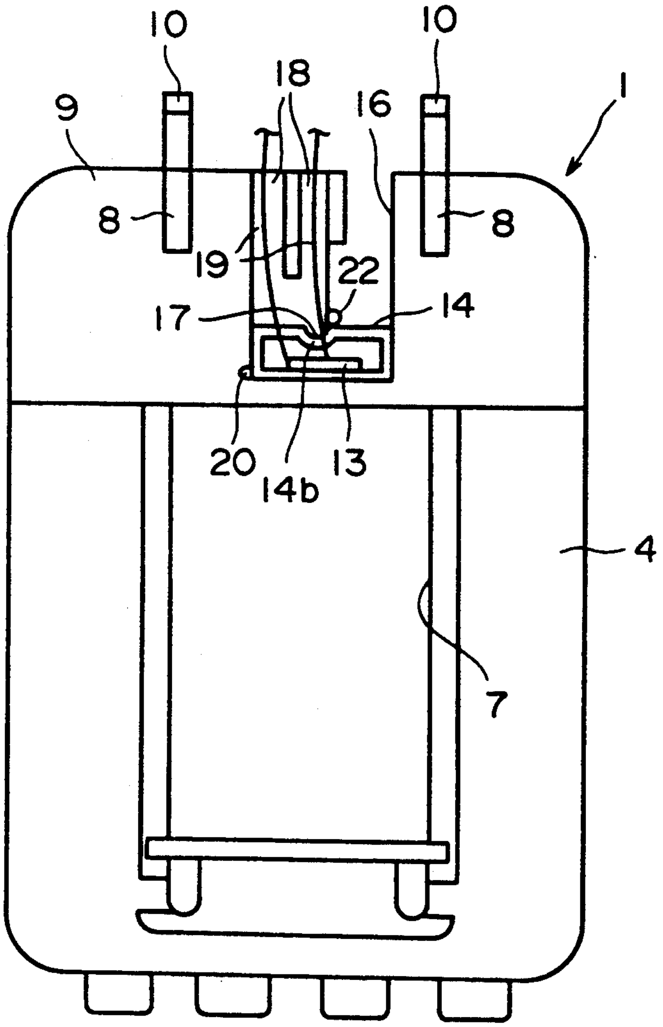
FIG. 1 is a front view of a transformer bobbin showing a first embodiment of the present invention.
Figure 2:
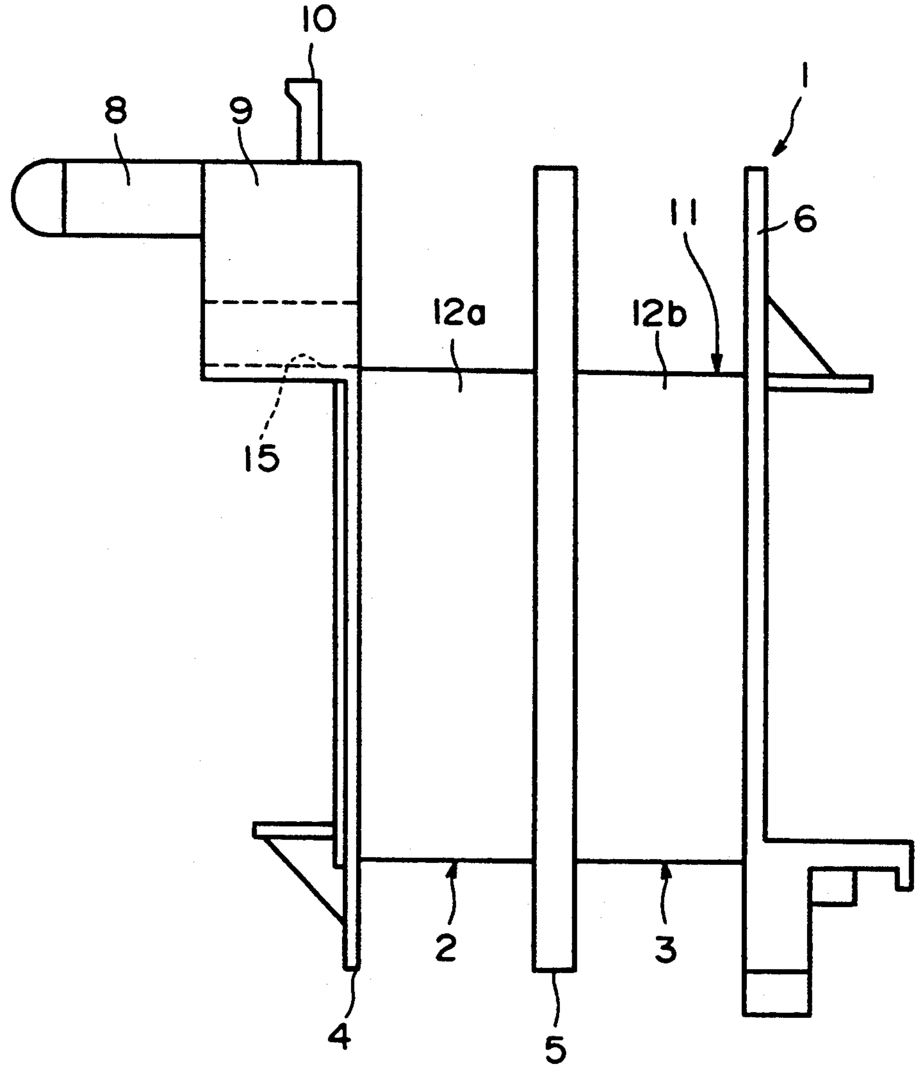
FIG. 2 is a side view of the bobbin, shown in FIG. 1, with its container case being removed.
Figure 3:
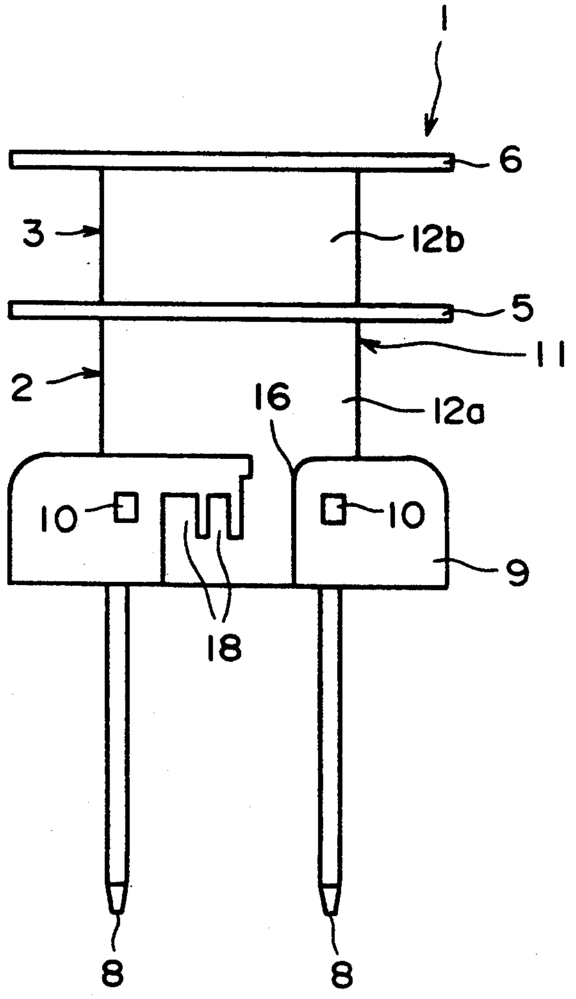
FIG. 3 is a plan view of the bobbin of FIG. 1 with its container case being removed.
Figure 5:
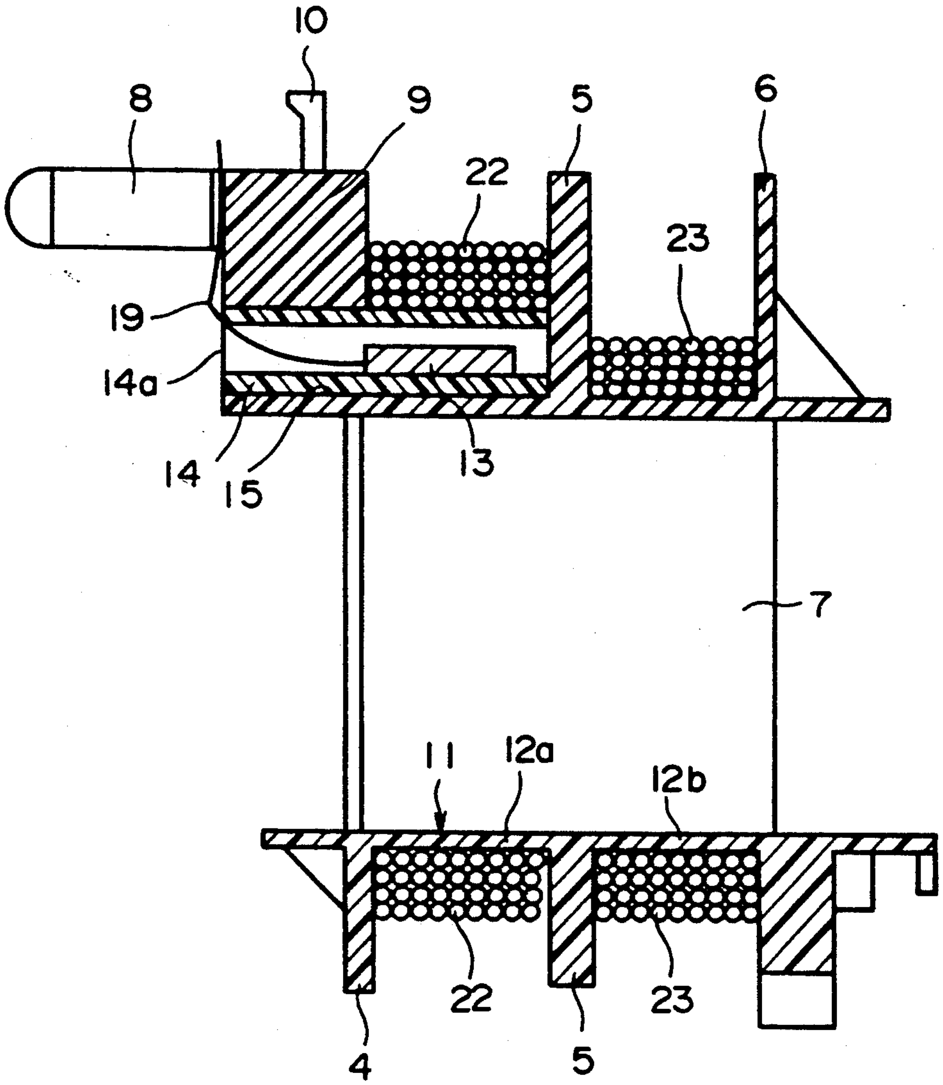
FIG. 5 is a cross sectional view of the bobbin of FIG. 1 provided with a thermal fuse.
Figure 6:
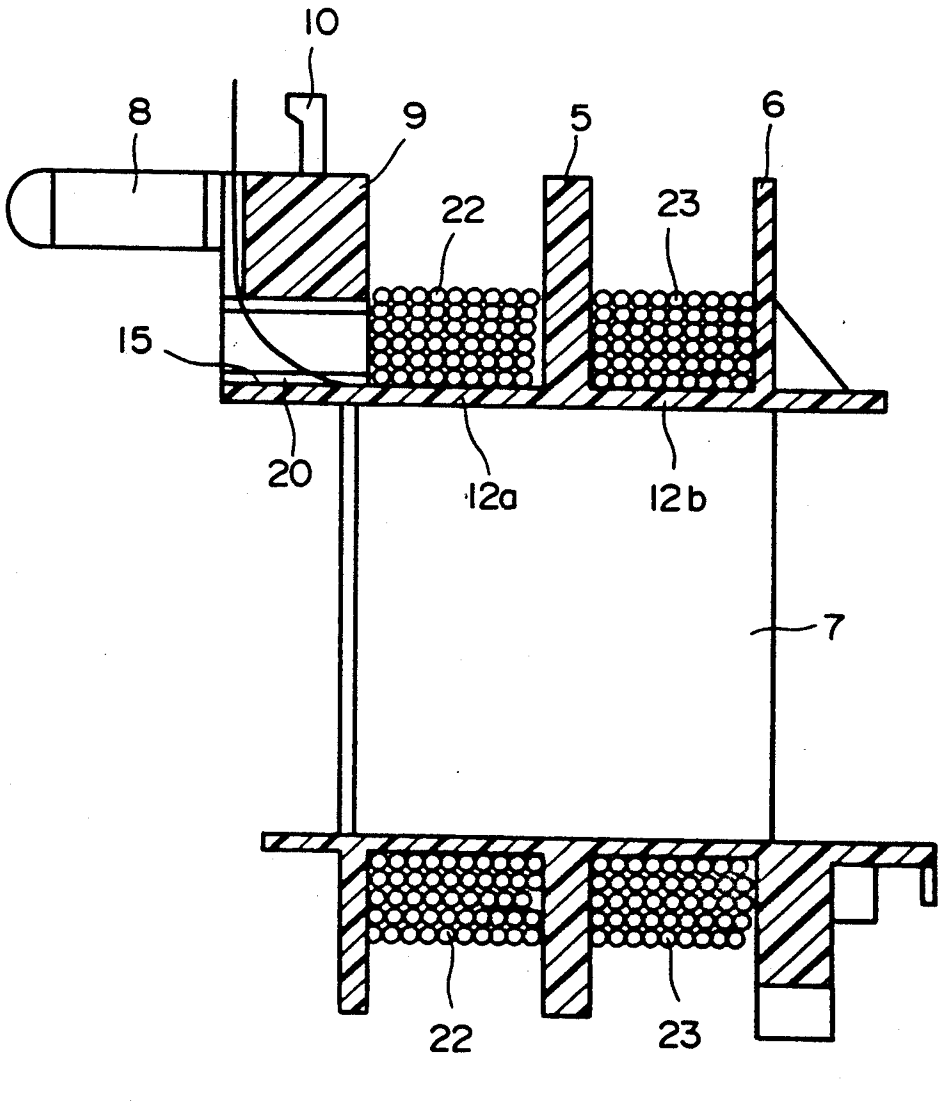
FIG. 6 is a cross sectional view of the bobbin of FIG. 1 provided with no thermal fuse.

A first embodiment of the present invention will now be described in the form of a transformer bobbin referring to FIGS. 1 to 6. The transformer bobbin denoted by the numeral 1 comprises a primary winding section 2 carrying a primary coil 22 (See FIGS. 5 and 6) wound thereon and a secondary winding section 3 carrying a secondary coil 23 (See FIGS. 5 and 6) wound thereon, as best shown in FIGS. 1 to 3. More specifically, the bobbin 1 of the first embodiment incorporates a frame 11 of approximately a rectangular shape in cross section. The frame 11 has at one (or front) end a first wall 4, at the other (or rear) end a second wall 6, and at center a center wall 5 which is thus interposed between the first 4 and the second wall 6. The primary winding section 2 extends from the center wall 5 through (a left half of) the frame 11 (See FIGS. 2, 5, and 6) to the first wall 4. The primary coil 22 is wound on an intermediate portion **12*a* of the frame 11 between the first 4 and the center wall 5 (as shown in FIG. 5 or 6). The secondary winding section 3 extends from the center wall 5 through (a right half of) the frame 11 (See FIGS. 2, 5, and 6) to the second wall 6. The secondary coil 23 is wound on an intermediate portion 12*b* of the frame 11 between the center wall 5 and the second wall 6 (as shown in FIG. 5 or 6**).

The bobbin 1 may integrally be formed of an insulating synthetic resin material. The primary 2 and the secondary winding section 3 are arranged in series. The frame 11 has at center a through opening 7 through which a core (not shown) is installed in a known manner. The three, first, center, and second, walls 4, 5, and 6 are formed of approximately a rectangular shape and thus, arranged substantially identical in size to each other.

The first wall 4 has at upper end a support protrusion 9 formed integral therewith. The support protrusion 9 is shaped to a block extending forward from the first wall 4. A pair of plug blades 8 are embedded at proximal end into the support protrusion 9 so that their distal ends extend to the front from the support protrusion 9. The plug blades 8 are arranged for insertion into a commercial receptacle jack for connection to the commercial AC power supply. Each plug blade 8 has at distal end a terminal 10 arranged to extend upward from the support protrusion 9. The two plug blades 8 are electrically connected at the terminals 10 to two opposite ends of the primary coil 22 respectively.

Also, the primary winding section 2 contains a thermal fuse 13 which serves as a current disconnecting means. As shown in FIG. 1, 4-A, and 4-B, the thermal fuse 13 is accommodated in a container case 14 of the bobbin 1. The container case 14 has a rectangular shape, in cross section, consisted of four side walls and is made of an insulating synthetic resin material. The inner space of the container case 14 defined by its four side walls is shaped to a rectangular parallelogram.

An opening 15 of a shape corresponding to the rectangular shape of the container case 14 is provided across the support protrusion 9 and the first wall 4. The container case 14 is mounted through the opening 15 to the outer surface of the intermediate portion 12*a* of the frame 11 in the primary winding section 2. As shown in FIG. 5, the outer surface of the intermediate portion 12*a* of the frame 11 is arranged flush with the lowermost end of the opening 15 extending across the support protrusion 9 and the first wall 4 so that the container case 14 can be assembled to the intermediate portion 12*a* or the primary winding section 2 with ease.

The container case 14 has a groove 14*b* therein extending lengthwisely or more particularly, in a mounting direction, as best shown in FIG. 4-A. The groove 14*b* is preferably provided in the upper surface of the upper side wall of the container case 14, which will be explained later in more detail. For engagement with the groove 14*b* of the container case 14, a rib 17 which extends along the depth of the opening 15 is arranged on the first wall 4 and the support protrusion 9. Also, a slit 16 is provided in the first wall 4 and the support protrusion 9, which extends from the uppermost to the opening 15. In production, the primary coil 22 is wound through the slit 16 onto the intermediate portion 12*a* of the frame 11 by a known process. As shown in FIG. 1, the rib 17 on the first wall 4 and the support protrusion 9 is projected downwardly at a corner where the opening 15 is defined against the slit 16 so that the container case 14 can easily be installed in the bobbin 1 by insertion in a direction from this side to the other side of the paper (to the right in FIG. 5) with its groove 14*b* being engaged with the rib 17. In contrary, the container case 14 may have a rib while the groove is provided in the first wall 4 and the support protrusion 9.

Also, a recess 20 is provided at a corner (lower left in FIG. 1) of the opening 15 in the first wall 4 and the support protrusion 9. The support protrusion 9 has two vertically extending grooves 18 provided in the recessed front surface thereof. As shown in FIG. 1, the two grooves 18 are arranged to accept respectively two upwardly extending lead lines 19 of the thermal fuse 13 which will be described in more detail later.

The assembly of the bobbin 1 will now be explained.

Firstly, the procedure will be described as accompanied with the thermal fuse 13 referring to FIGS. 1 to 5. The thermal fuse 13 is installed into the container case 14. The container case 14 is then mounted through the opening 15 across the support protrusion 9 and the first wall 4 to the primary winding section 2. As understood, the container case 14 is inserted in the opening 15 as guided with the rib 17 which is in engagement with its groove 14*b* so that it can correctly be placed at a predetermined position. The container case 14 is now seated properly with its rear end remaining in direct contact with the center wall 5, as shown in FIG. 5. More specifically, while the container case 14 is closed at rear opening end with the center wall 5, the thermal fuse 13 rests in an interior space defined by the four side walls of the container case 14 and the center wall 5. The container case 14 is held at its front half in the opening 15 of the front wall 4 and the support protrusion 9 while its rear half sitting on the intermediate portion 12*a* of the frame 11, thus being prevented from lateral movement. Although the container case 14 has two opening ends in the first embodiment, it may be closed at one end with an end wall.

One of the two lead lines 19 of the thermal fuse 13 is connected to the terminal 10 of one plug blade 8 and the other lead line 19 is connected to the primary coil 22. More particularly, the primary coil 22 is connected at one end through the thermal fuse 13 to the terminal 10 of the plug blade 8 while the other end is directly coupled to the terminal 10 of the other plug blade 8. For installation, the thermal fuse 13 may be loaded into the container case 14 after the container case 14 is mounted to the frame 11.

In operation, the thermal fuse 13 located on the inner side of the primary coil 22 detects a temperature of the primary coil 22 across the side wall of the container case 14. If the temperature of the primary coil 22 is increased to a limit level, the thermal fuse 13 disconnects a primary circuit containing the primary coil 22 and thus, overheating of the primary coil 22 will be averted.

According to the first embodiment, a wire for the primary coil 22 is fed inward through the slit 16 and wound onto the intermediate portion 12*a* of the frame 11. As the rib 17 on the first wall 4 and the support protrusion 9 is closely fitted into the groove 14*b* of the container case 14, the wire will hardly move (further to the left in FIG. 1) into an overhead gap on the container case 14.

Secondly, the procedure with the thermal fuse 13 not accompanied will be described referring to FIG. 6. The container case 14 is not needed and the primary coil 22 is directly wound on the intermediate portion 12*a* of the frame 11. More specifically, a wire for the primary coil 22 which is connected at one end to the terminal of one plug blade 10, is fed through the opening 15 or slit 16 and wound closely onto the intermediate portion 12*a* of the frame 11. The finished primary coil 22 is thus spaced from the unshown core installed in the through opening 7 by an inner wall of the frame 11 of which thickness is as low as about 1 mm. Accordingly, the primary coil 22 like the secondary coil 23 is wound most close to the core, thus consuming a minimum length of the wire and lowering the transmission loss of energy.

Also, while the wire for the primary coil 22 is fed through the opening 15 for winding on the intermediate portion 12*a* of the frame 11, it comes to run in the recess 20 and will thus be prevented from lateral movement.

Figure 7:
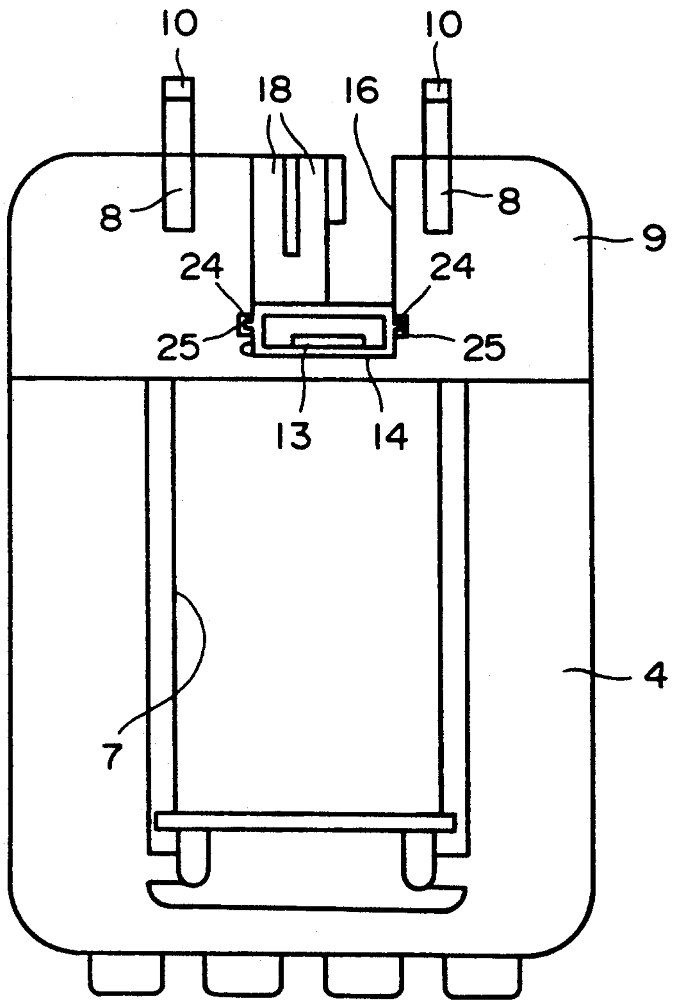
FIG. 7 is a front view of another transformer bobbin showing a second embodiment of the present invention.

A second embodiment of the present invention is illustrated in FIG. 7, in which like components of a transformer bobbin are represented by like numbers as of the first embodiment and will be no more explained.

As shown in FIG. 7, a guiding rib 25 is arranged on each side wall of the container case 14, which extends from the front end to the rear end in an insertion direction. Also, two grooves 24 are provided at the two, left and right, sides of the opening 15 respectively in the first wall 4 and the support protrusion 9 so that they can engage with the two ribs 25 of the container case 14 at installation. The other arrangement of the second embodiment is substantially equal to that of the first embodiment. Accordingly, the transformer bobbin of the second embodiment will provide the same advantages as of the first embodiment.

It is understood that the present invention is not limited to the two transformer bobbins of the foregoing embodiments and other modifications and changes will be possible without departing form the scope and spirit of the present invention.

We claim:

1. In a transformer bobbin comprising a frame of approximately a rectangular shape, a first wall arranged on one end of the frame, a second wall arranged on the other end of the frame, and a center wall arranged between the first wall and the second wall, in which the frame, the first wall, and the center wall constitute in combination a primary winding section on which a primary coil is wound while the frame, the center wall, and the second wall constitute in combination a secondary winding section on which a secondary coil is wound, said primary winding section having a selectively usable container case detachable mounted on the frame of the primary winding section, the container case accommodating a current disconnecting means for deenergizing a transformer circuit when the coil temperature increases up to a limit level, and the primary coil being wound onto the frame and the container case.

2. A transformer bobbin according to claim 1, wherein the first wall has an opening therein through which the container case is detachable mounted on the fame of the primary winding section.

3. A transformer bobbin according to claim 2, wherein the container case is shaped to a tubular form having approximately a rectangular configuration in cross section and arranged for defining together with the center wall an interior space in which the current disconnecting means is placed.

4. A transformer bobbin according to claim 2, wherein the first wall has an inwardly extending rib or groove provided on the opening side thereof and the container case has a lengthwisely extending groove or rib provided thereon for close engagement with the rib or groove of the first wall so that it can properly be guided during installation.

5. A transformer bobbin according to claim 4, wherein the first wall has a slit therein extending from the uppermost to the opening and the inwardly extending rib of the first wall is projected downwardly to the opening at a corner where the opening is defined against the slit, the groove of the container case engages with the rib of the first wall, and the primary coil is fed through the slit and wound onto the frame and the container case.

6. A transformer bobbin according to claim 3, wherein the first wall has a recess provided therein at a lower corner of the opening and the primary coil to be directly wound onto the frame of the primary winding section through the recess when the container case is not used.

7. A transformer bobbin according to claim 2, wherein the first wall has a support protrusion of block shape provided on the upper front thereof and the support protrusion carries a pair of plug blades for in feeding of a commercial current, whereby the opening is arranged extending across both the support protrusion and the first wall.

8. A transformer bobbin according to claim 7, wherein the support protrusion has at front side a pair of grooves therein extending from the uppermost to the opening for accepting two lead lines of the current disconnecting means respectively.

* * * * *

UNITED STATES PATENT AND TRADEMARK OFFICE

CERTIFICATE OF CORRECTION

PATENT NO. : 5,321,572
DATED : June 14, 1994
INVENTOR(S) : Shibui et al.

It is certified that error appears in the above-indentified patent and that said Letters Patent is hereby corrected as shown below:

On the title page,

Item (73) --Nippon Densen Corporation-- should read --Nippon Densan Corporation--

Signed and Sealed this

Sixteenth Day of May, 1995

Attest:

BRUCE LEHMAN

*Attesting Officer* *Commissioner of Patents and Trademarks*